United States Patent

Jay

[11] 3,810,530
[45] May 14, 1974

[54] WHEEL CHOCK
[75] Inventor: Richard S. Jay, Evanston, Ill.
[73] Assignee: Jarke Corporation, Chicago, Ill.
[22] Filed: Jan. 8, 1973
[21] Appl. No.: 321,832

[52] U.S. Cl. .............................................. 188/32
[51] Int. Cl. ............................................. B60t 3/00
[58] Field of Search .......................... 188/32, 4 R

[56] References Cited
UNITED STATES PATENTS
3,265,159  8/1966  Worden ............................. 188/32
3,289,794  12/1966  Miles .................................. 188/32

FOREIGN PATENTS OR APPLICATIONS
497,605   5/1930  Germany ........................... 188/32
504,586   8/1930  Germany ........................... 188/32
922,396   8/1955  Germany ........................... 188/32
310,185   4/1929  Great Britain ..................... 188/32

Primary Examiner—Duane A. Reger
Attorney, Agent, or Firm—Dominik, Knechtel, Godula & Demeur

[57] ABSTRACT

A wheel chock for use primarily with trucks is shown and described being of unitary construction and having parallel opposed complimentary side plates and an L-shaped member serving as a ramp plate and support plate portion. The unit is characterized by a plurality of uniformly spaced teeth at the bottom edge of the side plates for ground engaging contact, and hand hold portions including cutout ports in the opposed side plates as well as a reversely bent portion at the lower edge of the ramp plate. Optionally provided is a float plate at the underneath portion of the L-shaped support defining a substantially closed triangular member interior of the opposed side plates, with the float plate spaced closely above the ground engaging teeth to engage softer support materials when the teeth penetrate the same.

6 Claims, 4 Drawing Figures

PATENTED MAY 14 1974　　　　3,810,530

WHEEL CHOCK

BACKGROUND OF THE INVENTION

1. Field of the Invention

The field of invention relates to wheel chocks, and more particularly that type useful in positioning beneath the tire of an automobile or truck. Such wheel chocks are classified, amongst other places, in Patent Office Class 188, subclass 32.

2. Description of the Prior Art

Wheel chocks are disclosed and described in several patents. One such recent example appears in U.S. Pat. No. 3,387,686 disclosing a collapsible wheel chock. A pair of wheel chocks with ground engaging elements is shown in U.S. Pat. No. 2,697,494. Another example of a collapsible wheel chock appears in Pat. No. 2,818,940.

In the prior art patents disclosing wheel chocks just referred to, none of them shows a single unitary type wheel chock having rugged ground engaging elements, and yet one which is easily portable. With the advent of OSHA regulations, and the requirements that trucks be chocked at all times while at a loading dock, it becomes important to provide for use by the shipper and trucker in particular a unitary rugged wheel chock which will securely engage any ground or pavement elements and the wheel of the truck itself.

SUMMARY

The invention contemplates a wheel chock having a pair of parallel complimentary generally triangular opposed side plates, the same being joined by a single unitary substantially L-shaped member having one portion defining a ramp plate and another portion defining a support plate. The bottom edges of the side plates have sequential uniform relief portions defining ground engaging contact points. A hand hold is provided optionally by means of an elongate elliptical cutout in the side plates, and also by a reversely folded portion at the lower edge of the ramp plate portion of the L-shaped member. In one alternative embodiment, a float plate is provided to close the hypotenuse of the L-shaped member and be positioned in close parallel overlying relationship to the lower edge portion of the side plates and their ground engaging members to take over and serve to float the chock on soft surfaces where the ground engaging members penetrate the same.

It is one of the principal objects of the present invention to provide a rugged unitary wheel chock that can be readily manufactured from a formed piece of safety plate, and a pair of opposed side plates.

Another and related object of the present invention is to provide such a wheel chock with ground engaging elements that will insure against dislodgement.

Still another object of the present invention is to provide a wheel chock with the aforesaid advantages and which also is portable, and has optional means for both removing the same from its engaged position as well as carrying the wheel chock to another location.

Still another object of the present invention is to provide means for ground engaging secure contact, and optional means for floating the same where the surfaces are soft.

DESCRIPTION OF DRAWINGS

Further objects and advantages of the present invention will become apparent as the following description proceeds taken in conjunction with the accompanying illustrative drawings in which.

DESCRIPTION OF PREFERRED EMBODIMENT

Figure 1:
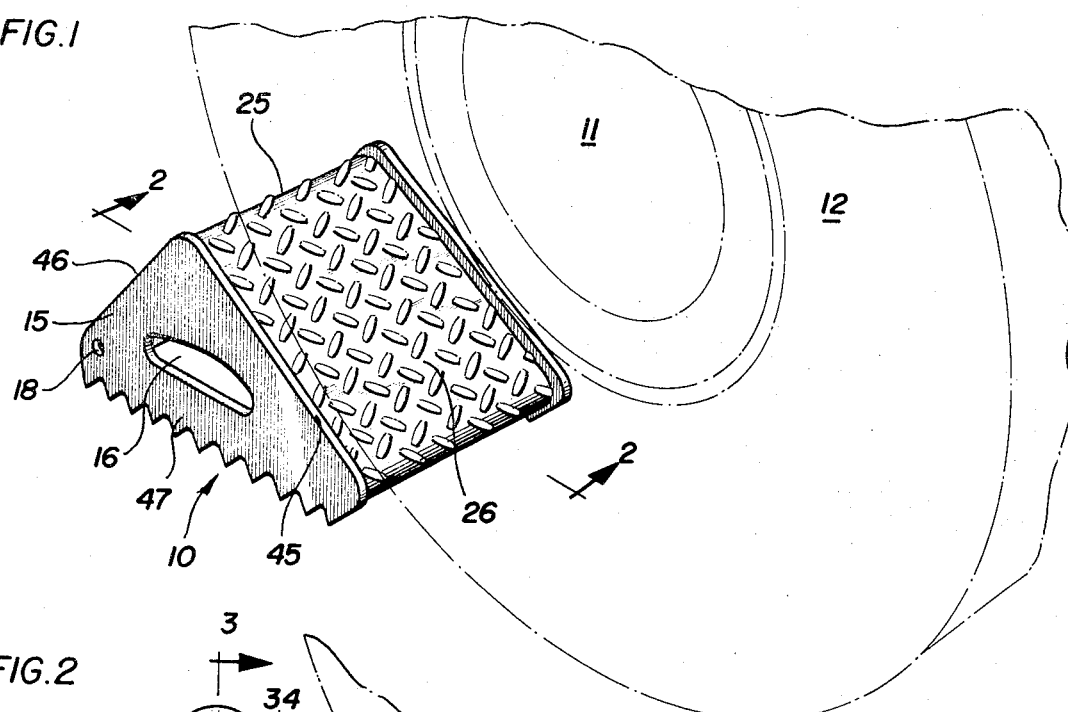
FIG. 1 is a perspective view showing in phantom lines a typical wheel and tire engaging the wheel chock illustrating the present invention.

The preferred embodiment of the subject wheel chock 10 is shown in perspective view in FIG. 1 where it is seen engaging the tire 12 of a wheel 11, most normally that of a truck. The wheel chock 10 has a pair of opposed side plates 15 each of which is generally triangular in configuration and substantially but not necessarily a right triangle. Each of the side plates has a ramp edge 45, a support edge 46 (these two edges joining at substantially a right angle) and a bottom edge 47. Centrally disposed in the side plate 15 is a longitudinal semi-elliptical hand hold port 16. Also, at approximately the point where the support edge 46 joins the bottom edge 47, provision is made for a chain hole 18 into which a chain or a line can be inserted for carrying as well as assisting in removing the wheel chock 10 from the beneath the tire 12.

Figure 2:
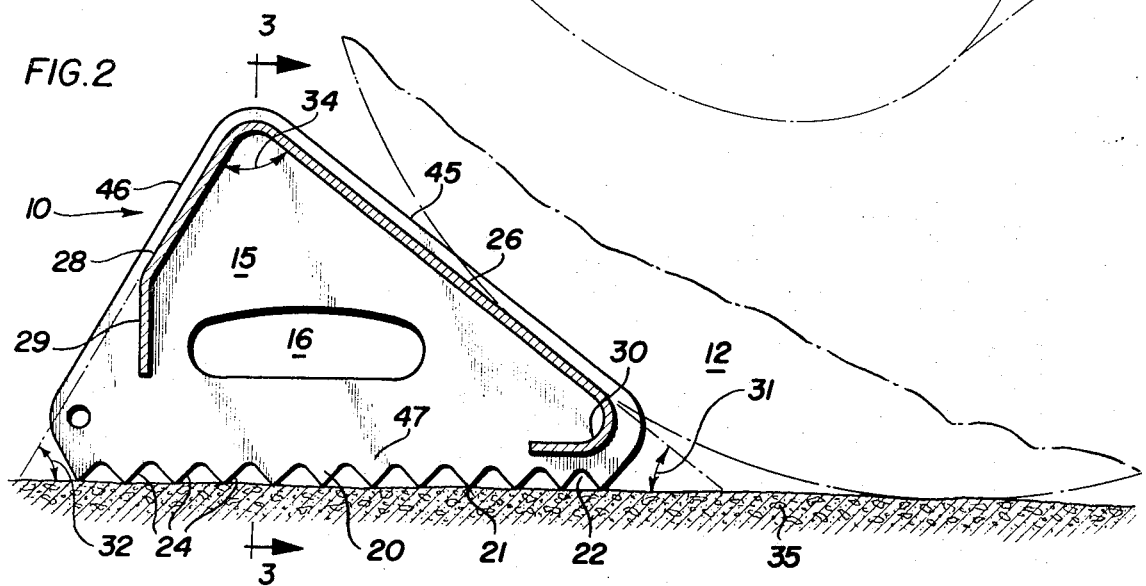
FIG. 2 is a front elevation taken along section line 2—2 of FIG. 1 showing the relationship of the interior portion of the chock plate and more particularly the wheel ramp portion with the tire of the tire and wheel combination shown in FIG. 1.
Figure 3:
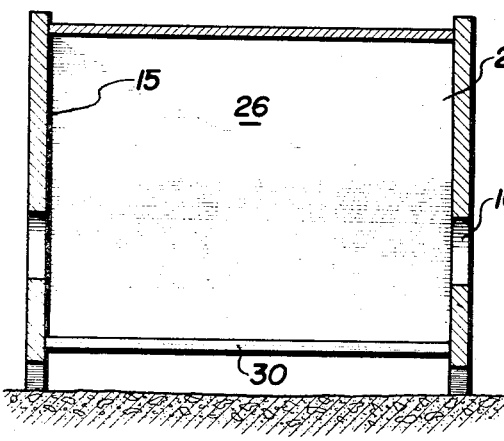
FIG. 3 is a transverse sectional view of the wheel chock taken along section line 3—3 of FIG. 2 in the same scale thereof.

To support the chock 10 on pavement 35 such as illustrated in FIG. 2, a plurality of saw teeth 20 are provided along the bottom edge 47 of the two side plates 15. The saw teeth 20 include saw tooth points 21 and saw tooth relief 22 defined by the saw tooth opposed faces 24. While shown here as saw teeth, it will be appreciated that crescent shaped cutouts will also provide the uniformly spaced pointed members for engaging the pavement 35.

The side plates 15 are joined by a single unitary L-shaped member 25 having a ramp plate portion 26 and a support portion 28. The support portion 28 also includes an offset 29 which extends downwardly toward the bottom edge 47 of the side plates 15. At the lower terminal edge of the ramp plate 26 provision is made for a reversely curved hand grip 30 which extends across the entire lower portion of the ramp plate 26 and assists the user in carrying the same after it has been removed from beneath the tire 12.

The preferred angle 31 for the relationship between the ramp plate 26 and the bottom edge 47 of the side plates 15 is 37°, although it will be appreciated that angles between 30° and 45° will prove satisfactory depending upon the size and proportion of the wheel chock 10 and the tire 12 normally anticipated for engagement. For example, where an airplane tire is involved, of smaller diameter, a larger angle perhaps than the 37° just recited would prove more desirable. The support plate angle 32 defined by the intersection between the support plate 28 and the lower edge 47 of the side plate 15 is approximately 77°, and the apex angle defined by the intersection between the ramp plate 26 and the support plate 28 is approximately 88°. As mentioned above, it will be appreciated that slight variations in these angles may be accomplished, but generally the relationship of an approximate L-shape and substantially a right triangle will remain.

Figure 4:
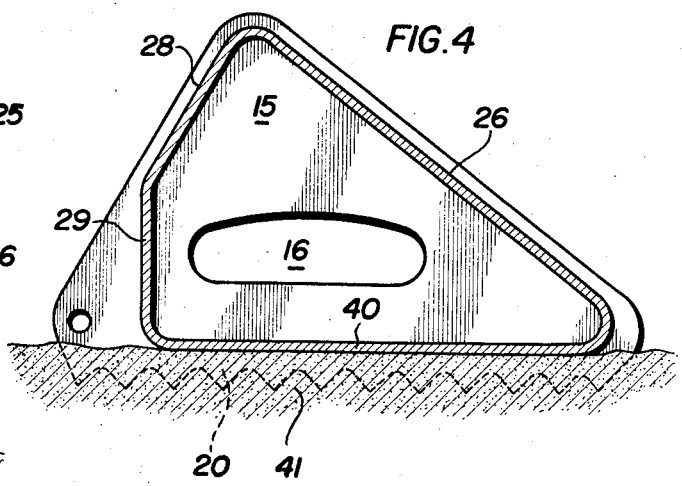
FIG. 4 is a longitudinal sectional view of the illustrative wheel chock in an alternative embodiment taken along the same elevation and section as shown in FIG. 2 illustrating the employment of a float plate at the lower portion of the L-shaped support member.

As shown particularly in FIG. 4, where soft ground 41 is being encountered, the teeth 20 will more readily penetrate the earth 41. To provide additional support, the support offset 29 is extended downwardly, and uniformly across to define a float plate 40 which, because of its flat nature, will float on the soft ground 41 and serve to inhibit further penetration by the teeth 20 of the wheel chock 10 into the soft ground 41.

The material employed for the L-shaped member 25, in a successful commercial embodiment, is 3/16-inch safety plate. The side plates 15 are ⅜-inch flat stock, and extend approximately ¼-inch beyond the ramp plate 26 and support 28.

The typical dimensions of the unit are 9¾ inches wide, 7¾ inches high, and 12½ inches long. The chain hole 18 is positioned 1¼ inches above the bottom of the teeth 20, and 9/16-inch inwardly from the outer portion of the side plate 15. A commercial embodiment thus conformed for a 40-inch diameter tire will weigh approximately 23 pounds. While this is sturdy and prevents the same from being readily blown away by winds, it is still not so heavy that the average operator around a loading dock will find it difficult to manipulate and maneuver the wheel chock 10.

In review it will be seen that a wheel chock has been disclosed and described which is relatively simple, secure in operation, and efficient to manufacture. Hand grip portions both in the side of the side plates 15 by means of a cutout 16, as well as a reversely turned extension hand grip 30 of the ramp plate 26 have been provided for convenience in use.

Although particular embodiments of the invention have been shown and described in full here, there is no intention to thereby limit the invention to the details of such embodiments. On the contrary, the intention is to cover all modifications, alternatives, embodiments, usages and equivalents of a wheel chock as fall within the spirit and scope of the invention, specification, and the appended claims.

What is claimed is:

1. A wheel chock comprising:
a parallel pair of complementary generally triangular opposed spaced apart side plates,
said side plates having ramp edges, support edges, and bottom edges,
a single unitary substantially L-sahped member, having a ramp plate and a support portion,
said L-shaped member being secured at its edges to the side plates defining a ramp portion at one end for engaging a portion of a truck tire.
a float plate reversely folded extension of the support portion of the ramp plate joined to the parallel side plates above and parallel to the bottom edge of said side plates
the bottom edges of said side plates having sequential uniform relief portions defining ground engaging contact points to brake the chock against displacement when engaged by a wheel whereby the float plate contacts the ground when the side plates, points and bottom edges penetrate the same.

2. In the chock of claim 1,
wherein the angle between the bottom edges of the side plates and the ramp portion of the ramp plate is between 35° and 45°.

3. In the chock of claim 1,
wherein the angle between the support portion of the ramp plate and the bottom edge of the side plates is between 70° and 80°.

4. In the chock of claim 1,
wherein the support portion of the ramp plate terminates in an angled handle grip.

5. In the chock of claim 1,
wherein elongate ports are provided in the side plates to serve as a hand grip.

6. In the chock of claim 1,
a plurality of saw tooth members defining the ground engaging contact points.

* * * * *